United States Patent [19]

Cloutier et al.

[11] 4,236,748
[45] Dec. 2, 1980

[54] STAKE FOR TRUCK BED, TRAILER OR TRUCK STRUCTURE

[76] Inventors: Denis L. Cloutier, 632 - 2nd Ave., Beauceville-Est, Quebec, Canada, G0S 1A0; Fernand Cloutier, 120 Verdier St., St-Joseph de Beauce, Quebec, Canada, G0S 2V0

[21] Appl. No.: 14,484

[22] Filed: Feb. 23, 1979

[51] Int. Cl.³ .............................................. B60P 7/06
[52] U.S. Cl. ..................................... 296/43; 296/104
[58] Field of Search ................. 296/181, 183, 104, 36, 296/43

[56] References Cited

U.S. PATENT DOCUMENTS 3,692,354  9/1972  Tuerk ..................................... 296/43
3,940,179  2/1976  McBride ................................ 296/43
4,067,601  1/1978  Tuerk .................................... 296/43

*Primary Examiner*—John J. Love
*Assistant Examiner*—John A. Carroll

[57] ABSTRACT

A stake adapted to be inserted at its lower end into pockets placed around the periphery of a flatbed trailer or truck structure is disclosed. The stake comprises an elongated hollow body of right triangular cross-sectional configuration having two right angle walls and a substantially diagonal wall joining the two right angle walls. The internal configuration of one of the right angle walls and of the diagonal wall has, over the full length of the stake, cooperating thickened portions adapted to receive the end of tarpaulin rods.

8 Claims, 6 Drawing Figures

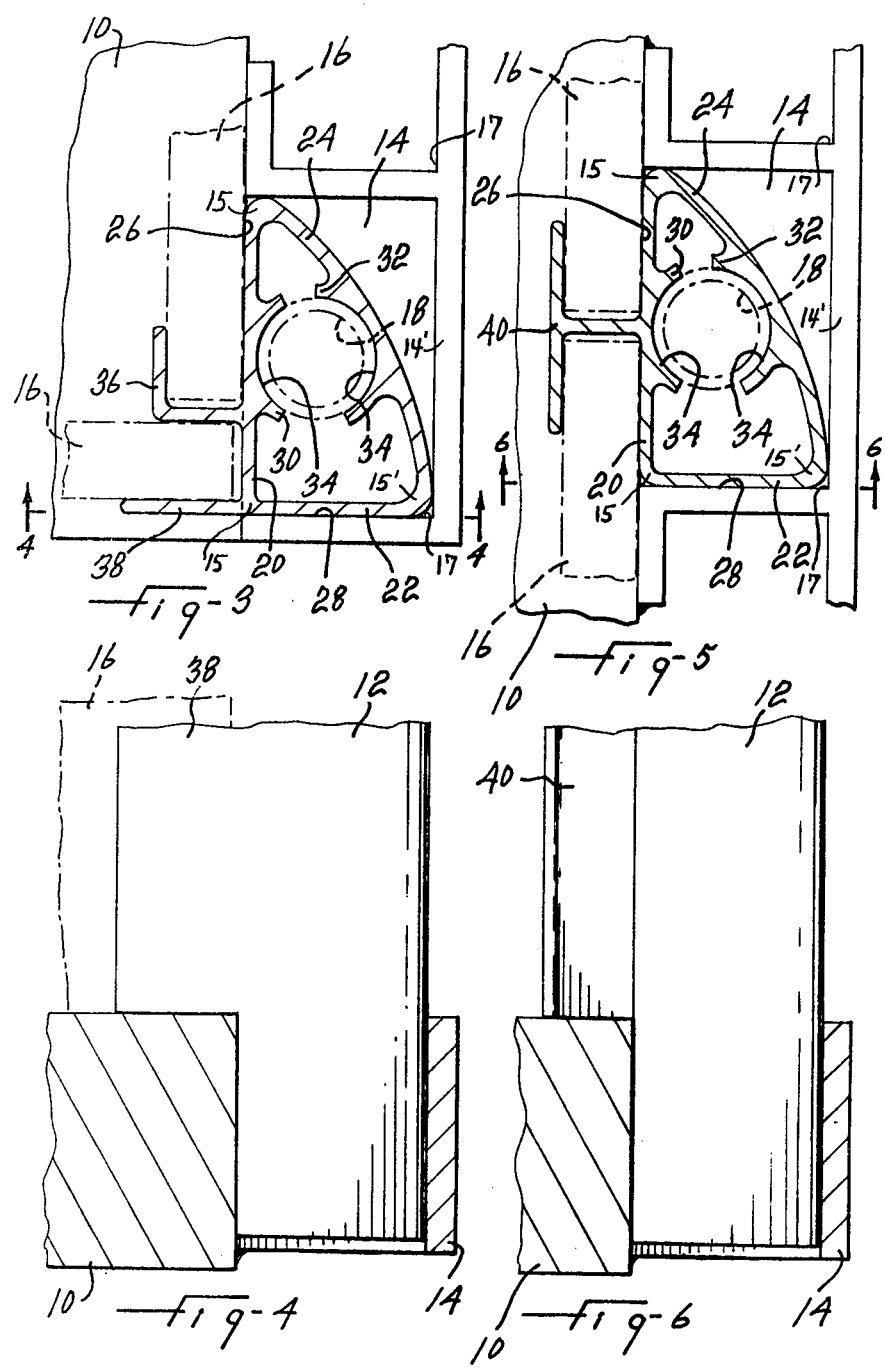

STAKE FOR TRUCK BED, TRAILER OR TRUCK STRUCTURE

This invention relates to a stake configuration for flatbed trailer or truck structures.

The larger number of trailers or truck structures are flatbed and, in order to improve the versatility of the flatbed, it is common practice to provide it with panels held by removable vertical stakes inserted into four-sided, generally rectangular, conventional pockets secured around the periphery of the flatbed so as to use the latter for transporting cargo. The side walls are connected by tarpaulin bowed rods inserted into the top of the stakes. In order to cut down air resistance of the stakes, since they protrude from the walls formed by the panels, the leading surface of the stakes is usually inclined relative to the panels. One example of such an arrangement is the one disclosed in Canadian Patent No. 944,412 issued Mar. 26, 1974.

One major problem with the above convertible truck or trailer structure is that the stake has a cross-section in the shape of an isosceles triangle. One of its apex edges engages the mid portion of the outer wall of the pocket producing deformation of the pocket under a force exerted on the stake laterally of the flatbed. Therefore the stake rapidly becomes loose in the pocket. Also, a tubular nipple must be welded inside the upper end of the stake to receive the tarpaulin bowed rod. If the stakes need to be cut to lower the height of the tarpaulin, new nipples must be welded to the stake.

It is therefore the object of the present invention to provide a stake of improved configuration which overcomes the above noted disadvantages.

The stake, in accordance with the invention, includes the conventional channel means for receiving the wall forming panels, and is characterized by an elongated hollow body of generally right triangular cross-sectional configuration having two right angle walls and a substantially diagonal wall joining the two right angle walls with each of the apex edges of the body adapted to fit a corner of the four-sided pocket. Preferably, the internal configuration of one of the right angle walls and of the diagonal wall has, over the full length of the stake, cooperating thickened portions adapted to receive the end of a tarpaulin rod of predetermined cross-section.

The channel means of the corner stake preferably comprises an elongated L-shaped configuration having one leg integral with and extending perpendicularly from one of the right angle walls and an elongated straight shaped configuration integral with and extending perpendicularly from such one right angle wall and located in the same plane as the other right angle wall. The L-shaped and the straight shaped configurations form channels for receiving adjacent panels at right angle at each corner around the periphery of the flatbed structure.

The other stakes located along the sides of the flatbed trailer or truck structure have channel means preferably including an elongated T-shaped configuration having a base integral with and extending perpendicularly from one of the right angle walls to form channels for receiving the edge of co-planar panels mounted vertically between adjacent stakes.

The T-shaped, L-shaped and straight shaped configurations extend only to the top of the flatbed while the main elongated body of the stake extends into the pockets along the sides of the flatbed.

The invention will now be disclosed, by way of example, with reference to the accompanying drawings in which:

FIG. 3 illustrates a view taken along line 3—3 of FIG. 1;

FIG. 4 illustrates a view taken along line 4—4 of FIG. 3;

FIG. 5 illustrates a view taken along line 5—5 of FIG. 1; and

FIG. 6 illustrates a view taken along line 6—6 of FIG. 5.

Figure 1:
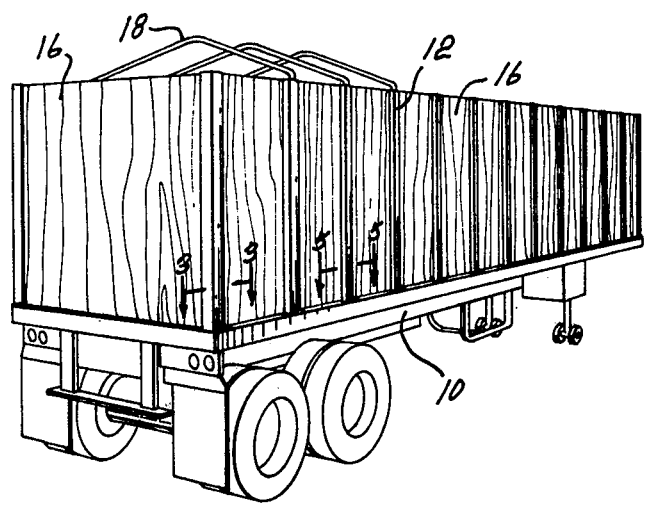
FIG. 1 illustrates a perspective view of a flatbed trailer type structure incorporating the stakes in accordance with the invention.
Figure 2:
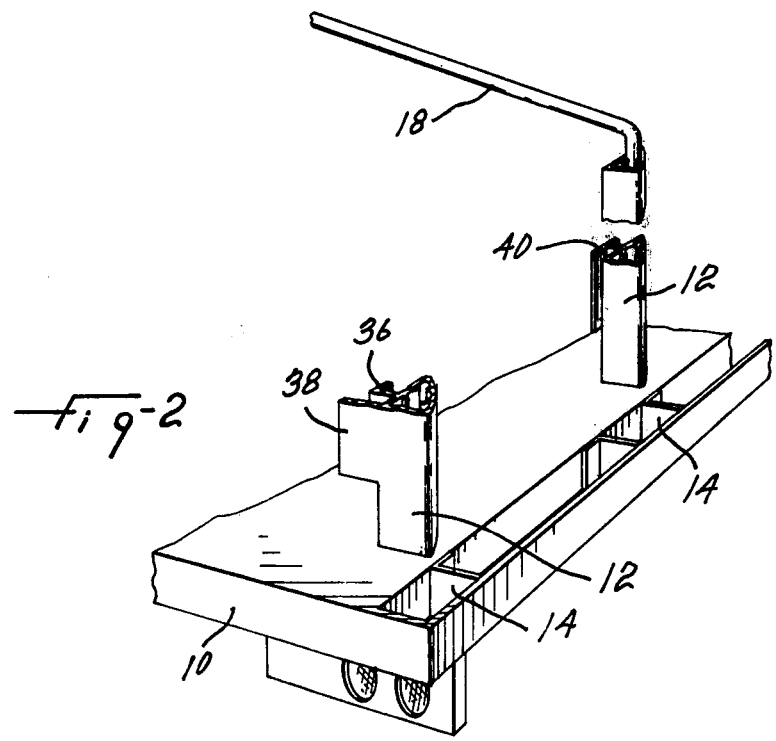
FIG. 2 illustrates an enlarged exploded view of a portion of the flatbed trailer of FIG. 1 to show more clearly how the stakes are inserted into pockets in the periphery of the flatbed, and how the tarpaulin rods are inserted into the stakes.

Referring to FIGS. 1 and 2 of the drawings, there is shown a flatbed trailer 10 having a plurality of stakes 12 having their lower end inserted into pockets 14 spaced around the periphery of the flatbed. Panels 16 are mounted in between the stakes 12 to form cargo retaining walls. Bowed rods 18 are inserted in the top of the stakes to hold the side walls and also for supporting a tarpaulin in known manner.

FIG. 3 to 6 illustrate the shape of an embodiment of a stake in accordance with the invention. Such stake consists of an elongated hollow body made of metal, such as extruded aluminum, or of other suitable material. The elongated body is right triangular in cross-section and consists of two right angle walls 20 and 22 and a slightly convex diagonal wall 24 joining walls 20 and 22. The lower end of the stake is adapted for insertion into the conventional four-sided and normally rectangular pockets 14 of the flatbed with the wall 20 engaging the side 26 of the flatbed and the wall 22 engaging the side 28 of the pocket. The diagonal wall 24 faces the front of the vehicle for creating an aerodynamic effect and cut down air resistance. It will be noted that each of the apex edges 15, 15' of the stake fits against a corner of the pocket 14. More particularly, outer apex edge 15' fits against outer corner 17 of pocket 14 instead of bearing against the weaker middle portion of outer wall 14' of the pocket 14 as in the above noted Canadian patent. Therefore, pocket 14 is much less liable to deform under a force exerted on the stake transversely of the flatbed 10.

The walls 20 and 24 are provided with thickened cooperating portions 30 and 32 adapted to receive the end of the tarpaulin bowed rod 18. In the embodiment disclosed in FIGS. 3 to 6, the facing surfaces 34 of the thickened portions 30 and 32 define segments of a circle to receive a circular rod 18. However, it is to be understood that such facing surfaces may have other configurations depending on the cross-sectional area of the tarpaulin bowed rod 18. Thickened portions extend over the full length of the body. Therefore the stake can be cut if the height of the tarpaulin needs to be lowered, and the stake is still ready to receive rod 18.

FIGS. 3 and 4 illustrate a corner stake. Such a corner stake includes an L-shaped configuration 36 having a leg integral with and extending perpendicularly from wall 20, and an integrally formed straight shaped configuration 38 extending in the same plane as wall 22.

Configurations 36 and 38 form channels for receiving the edge of corner panels 16 at right angle. As shown in FIG. 4, the L-shaped configuration and the straight shaped configuration only extend to the top of the flatbed whereas the main elongated body of the stake extends down into the pocket 14.

FIGS. 5 and 6 illustrate a stake used in the other pockets along the sides of the flatbed trailer or truck structure. Such stake has a body of the same cross-sectional shape as the body of the corner stake but includes a T-shaped configuration 40 having a base integral with and extending perpendicularly from the wall 20 of the stake. The T-shaped configuration forms channels for receiving the edge of adjacent panels 16. As shown in FIG. 6, the T-shaped configuration only extends to the top of the flatbed whereas the main body of the stake extends down into the pocket 14.

In assembling the trailer or truck structure, the stakes 12 are inserted into the pockets with the panels held in position by the channels formed by the L-, straight and T-shaped configurations integral with the stakes. The tarpaulin supporting bowed rods are inserted into the upper end of the stakes and help to hold the stakes and walls in position. The thickened portions 30 and 32 of the stake form strong pockets for receiving the end of the tarpaulin bowed rods and the whole assembly is rigid and capable of withstanding a large number of conversion cycles.

Whenever desired, the upper portion of the stakes can be cut and yet the latter can still receive the tarpaulin rods.

Although the invention has been disclosed with reference to a preferred embodiment, it is to be understood that it is not limited to such embodiment. For example, it can be used on any flatbed structure whether it is for a semi-trailer, truck or other types of vehicles. Furthermore, the shape of the tarpaulin rod receiving portion of the stake may vary depending on the cross-sectional shape of the tarpaulin rod or other holding element inserted into the top of the stake.

What I claim is:

1. A stake adapted to be inserted at its lower end into four-sided pockets spaced around the periphery of a vehicle flatbed and having channel means for receiving wall forming panels, said stake comprising a single piece, extruded elongated hollow body of generally right triangular cross-sectional configuration having two right angle walls and a substantially diagonal wall joining said two right angle walls along respective apex edges thereby defining three apex edges each adapted to fit a corner of said pocket, said channel means integrally formed with said body and projecting laterally from one of said two right angle walls, extending longitudinally of said body from one end thereof and terminating short of the other end thereof to abut against said flatbed while said body extends within said pocket.

2. A stake as defined in claim 1, wherein the internal configuration of one of said right angle walls and of said diagonal wall has along the full length of said body integral cooperating thickened portions forming a socket adapted to receive the end of a tarpaulin rod of predetermined cross-section.

3. A stake as defined in claim 2, wherein said thickened portions define segments of a circle so as to receive the end of a tarpaulin rod of circular cross-section.

4. A stake as defined in claim 1, wherein said diagonal wall is convex.

5. A stake as defined in claim 1, wherein said channel means include an elongated L-shaped configuration having one leg integral and extending perpendicularly from one of said right angle walls, and an elongated straight shaped configuration integral with and extending perpendicularly from said one right angle wall and being in the same plane as the other right angle wall, said L-shaped and said straight shaped configurations forming channels receiving adjacent panels at right angle at each corner around the periphery of the flatbed.

6. A stake as defined in claim 1, wherein said channel means include an elongated T-shaped configuration having a base integral with and extending perpendicularly from one of said right angle walls to form channels for receiving the edge of substantially co-planar panels mounted vertically between adjacent stakes.

7. A stake as defined in claim 5, wherein said pockets are formed on the side of the flatbed and wherein said L-shaped configuration and said straight shaped configuration extend only to top of said flatbed while the elongated body extends into the pockets along the side of the flatbed.

8. A stake as defined in claim 6, wherein said pockets are formed on the side of the flatbed and wherein said T-shaped configuration extends only to the top of said flatbed while the elongated body extends into the pockets along the side of the flatbed.

* * * * *